July 21, 1964  A. HARRIS  3,141,442
AQUARIUM RAFT FOR TURTLES AND THE LIKE
Filed Jan. 24, 1963
FIG_1
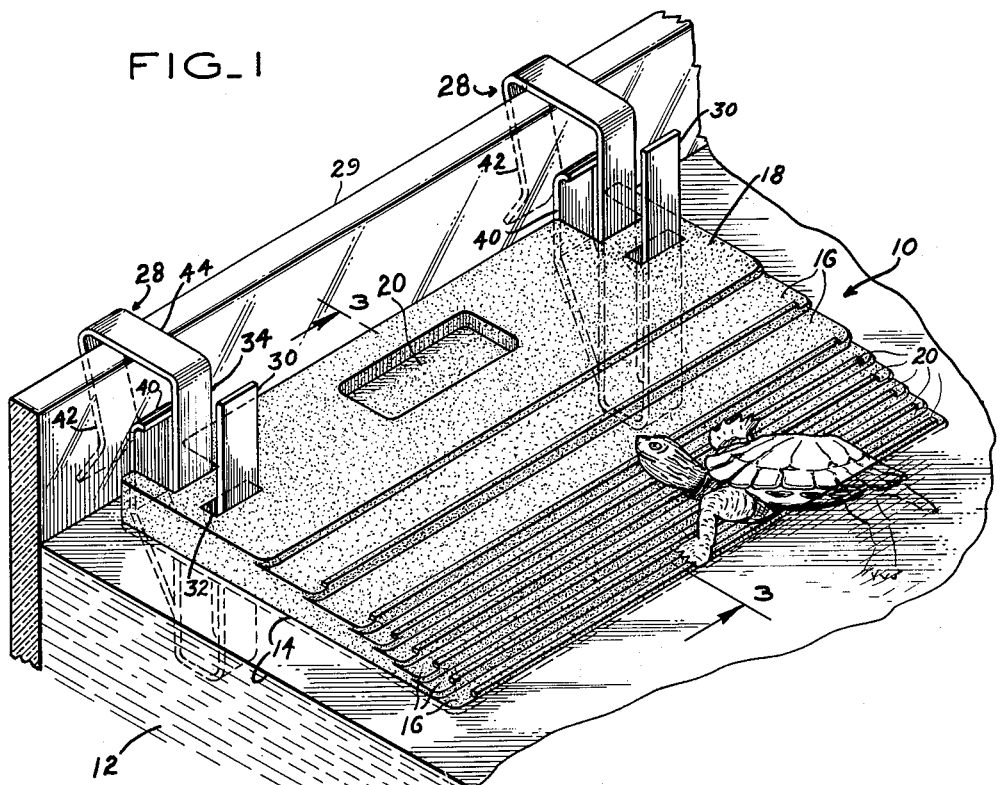
FIG.2
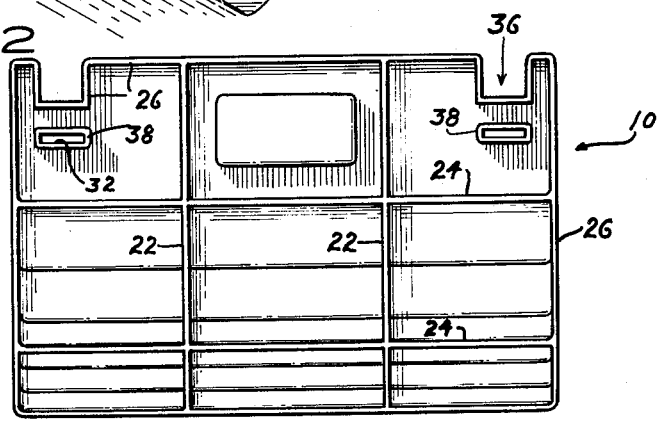
FIG_3
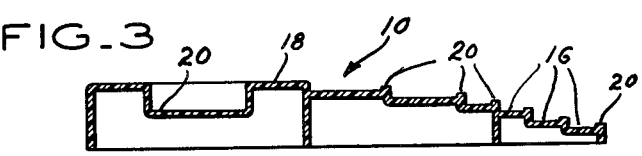

United States Patent Office 3,141,442
Patented July 21, 1964

3,141,442
AQUARIUM RAFT FOR TURTLES AND THE LIKE
Arthur Harris, 341 1st Ave., New York, N.Y.
Filed Jan. 24, 1963, Ser. No. 253,608
6 Claims. (Cl. 119—5)

This invention relates generally to an accessory for a home aquarium and has particular relation to a raft to be employed in a home aquarium for the use of turtles and the like.

In accordance with the invention the raft includes a floatable platform that is a one piece structure molded from light weight plastic. The upper surface or deck of the platform is inclined upwardly, preferably in stepped fashion, from the front edge and at a location adjacent the plane of flotation, toward the rear of the platform. This upper surface is preferably rather rough and upstanding ribs are formed on the steps so that the turtle or the like will be able to easily climb out of the water onto the raft.

While the plastic material of which the raft is made is sufficiently light that it will float in water, the greater part of the buoyancy of the raft is obtained by means of air chambers or compartments formed in the underside of the raft. These compartments or chambers are produced by means of downwardly extending partitions that extend from front to back and from side to side of the raft and by means of a downwardly extending rim that is provided all the way around the raft. This rim and these partitions extend below the plane of flotation so that when the raft is floating on the surface of the water in the aquarium, a substantial number of separate air chambers are formed and which are distributed throughout the transverse area of the raft. Since these chambers are open at their lower end or bottom, the floatable platform may be made of one piece with no sealing member being required for the chambers.

There is provided on the upper surface of the platform a suitable food retainer, which may be in the form of a trough or depression formed in this surface, and which is to contain food for the turtle or the like (small lizards, chameleons, etc.).

Mounting brackets are provided to mount the raft on the wall of the aquarium with these brackets including a portion that is to receive and embrace the aquarium wall and also including a portion that is to slideably engage the floatable platform in a manner which permits the platform to move vertically in accordance with variations in the height of the water in the aquarium but restricts lateral movement of the platform. The bracket construction is such that the floatable platform may be lifted vertically from the brackets while they remain in place on the aquarium wall so that the platform may be cleaned as desired and replaced.

Accordingly, it is an object of this invention to provide a raft for home aquariums for use with turtles and the like.

Another object is to provide such a raft that will float on the surface of the water in a home aquarium and which is stable and easy for turtles or the like to climb onto.

A further object is to provide such a raft that is readily removable from an aquarium for cleaning.

Still another object of the invention is to provide such a raft that is sturdy yet extremely simple and economic to manufacture.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIGURE 1 is a perspective view showing the raft as it is mounted in an aquarium;

FIGURE 2 is a bottom elevational view of the floatable platform, and;

FIGURE 3 is a sectional view of the platform taken generally along line 3—3 of FIGURE 1.

Referring now to the drawing, wherein like reference characters are used throughout to designate like elements, the illustrative and preferred embodiment of the invention illustrated therein depicts the raft as including a floatable platform 10 with this platform being shown floating on the surface of the water 12 in an aquarium with the plane of flotation, or in other words, the surface of the water 12 being identified as 14. This platform is a one piece molded plastic structure fabricated from a light weight plastic, such as polypropylene, that has a density less than that of water, such that it is unsinkable but will float on the surface of the water in the aquarium.

The platform is so constructed that it is stable and buoyant with it being relatively easy for a turtle or the like to climb onto and remain on the platform. To facilitate the turtle or the like climbing onto the raft the front portion of the platform is inclined or extends gradually upwardly from the front edge at a location close to the plane of flotation, or in other words close to the water's edge, toward the rear most region of the platform which is the highest portion of the platform. This upward inclination of the upper surface of the floatable platform is provided by means of the steps 16 (FIG. 3) with these steps extending up to the rear and uppermost region of the platform identified as 18. Traction for the turtle or the like is provided by means of having the upper surface of the platform relatively rough and providing ribs 20 that extend upwardly from the treads of the steps 16 at the forwardmost portion thereof. These ribs extend longitudinally along these steps and in effect provide something for the turtle or the like to grip when climbing onto the platform. With this structure the turtle, as illustrated in FIG. 1, may easily climb from the water up the inclined front portion of the platform and accordingly onto the raft.

The platform 10 carries in its region 18 a depression 20 for the retention of food for the turtles or the like.

The platform is relatively stable and buoyant because of the compartmented construction of the under or lower side of the platform. Downwardly open compartments are formed by means of the partitions 22 that extend from the front to the back of the platform and the partitions 24 which extend from one side to the other of the platform. There is additionally provided rim 26 which extends all the way around the platform. These partitions and this rim extend downwardly from the top or deck of the platform, which is relatively thin as viewed in FIG. 3, to a location below the plane of flotation of the platform. Accordingly, there are a number (nine in the illustrative organization) of downwardly open compartments which form separate air chambers when the raft is placed on the surface of the water in its properly oriented position. These separate chambers provide a stable flotation of the raft.

It is preferable that the chambers in the front portion of the raft be relatively narrow, as shown in FIG. 2, since it is this portion that the turtle or the like will first climb out onto from the water and this narrow chamber will provide greater stability.

In addition to providing the aforementioned chambers, the partitions 22, and 24 as well as the rim 26 add very substantially to the rigidity of the platform.

In order that the raft will not move about the aquarium but will move up and down on the surface of the water in the aquarium as the level thereof changes, there is provided a pair of brackets 28 that extend over and engage the wall 29 of the aquarium. Each of these brackets is preferably made of a resilient plastic and includes an upwardly opening U portion the front leg 30 of which is received in an opening 32 in the platform 10 while the rear leg 34 is received in the recess or indentation 36 formed in the rear edge of the platform. In order to prevent the escape of air from the compartment in which the opening 32 is formed there is provided about this opening, a sleeve or collar 38 that extends downwardly below the plane of flotation of the platform. The platform is slideable with relation to the legs 30 and 34 so that it may move up and down with the level of the water in the aquarium. Moreover, the platform may be vertically lifted from the brackets 28 without disturbing the brackets so that the platform may be taken from the aquarium and cleaned as desired and then replaced. Extending rearwardly and upwardly from the leg 34 is the arm 40 which engages the inner surface of the wall 29 of the aquarium and holds the leg 34 and accordingly the floatable platform spaced from this wall. This wall of the aquarium is clamped between this member 40 and the downwardly extending arm 42 that forms a part of the bracket and is connected with the lateral extension 44 that is directed rearwardly from the leg 38. The brackets 28 effectively prevent lateral movement of the platform 10 in the aquarium while permitting free vertical movement thereof.

It will thus be appreciated that with the present invention there is provided an extremely economic raft that may be mounted in an aquarium to float on the surface of the water thereof and upon which turtles or the like may readily climb for feeding or other purposes. The device is extremely simple to manufacture and easy to maintain being highly satisfactory in its operation.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. A raft for home aquariums comprising a floatable platform the upper surface of which is stepped upwardly from adjacent the plane of flotation at an edge of the platform, the steps having upwardly protruding gripping means disposed transversely therealong and spaced outwardly of the inner region of the step.

2. The raft of claim 1 including means for mounting the platform in an aquarium permitting vertical but preventing lateral movement thereof with the platform being upwardly removable from the mounting means.

3. A raft for home aquariums for turtles and the like comprising a floatable plastic platform, means forming a plurality of downwardly open air chambers distributed throughout the area of the platform, the upper surface of the platform being stepped upwardly from adjacent the plane of flotation at an edge of the platform, and upwardly directed gripping means disposed transversely along the tread of the steps and spaced outwardly from the inner region thereof.

4. The raft of claim 3 including means for positioning the raft in an aquarium while permitting vertical movement of the raft on the surface of the water of an aquarium with the raft being removable from this last mentioned means.

5. A raft for home aquariums for turtles and the like comprising a one piece floatable plastic platform provided with a plurality of separately downwardly open air chambers distributed throughout the area thereof, the upper surface of the platform being stepped upwardly from the front region adjacent the plane of flotation toward the rear region, upstanding rib means extending transversely along the treads of the steps and spaced from the inner region thereof and a feed trough adjacent said rear region.

6. The raft of claim 5 including a bracket for mounting the platform in an aquarium, said bracket having an upwardly open U portion received in the platform in a manner permitting vertical movement therebetween with the platform being vertically removable from the bracket.

References Cited in the file of this patent

UNITED STATES PATENTS

| | | |
|---|---|---|
| 175,019 | Borgfelt | Mar. 21, 1876 |
| 2,332,009 | Perri | Oct. 19, 1943 |
| 2,491,853 | Feldman | Dec. 20, 1949 |
| 2,711,714 | Timeus | June 28, 1955 |
| 2,718,211 | Pettas | Sept. 20, 1955 |
| 2,754,800 | Gare | July 17, 1956 |
| 3,091,220 | Willinger et al. | May 28, 1963 |
| 3,095,852 | Goldman | July 2, 1963 |